UNITED STATES PATENT OFFICE 1,955,031

METHOD OF PRECIPITATING AND SEPARATING SODIUM NITRATE AND AMMONIUM CHLORIDE

Wilhelm Steudemann, Altenburg, Germany

No Drawing. Application July 8, 1932, Serial No. 621,521. In Germany July 28, 1931

8 Claims. (Cl. 23—102)

My invention relates to the preparation and separation of sodium nitrate and ammonium chloride.

It is an object of my invention to provide an improved method for this purpose by which sodium nitrate and ammonium chloride are separated at comparatively high degrees of purity from a neutral watery solution in the absence of foreign substances.

Sodium nitrate is very important for many industrial pursuits and particularly for agricultural nitrogen fertilization. It has often been attempted to prepare it from ammonium nitrate and common salt by the reaction $$NH_4NO_3 + NaCl \longrightarrow NaNO_3 + NH_4Cl$$

The ammonium chloride is a by-product of the reaction and may be used as nitrogen manure or be re-changed into ammonium nitrate by known processes.

The above reaction, however, invariably requires certain auxiliary processes because the solubility conditions of the reciprocal salts do not show a way of separation based exclusively on phaseo-chemical reactions. For instance, solutions of nitric acid or ammonium hydrate, foreign salts such as salts of calcium or magnesium have been used for influencing the solubility, organic solvents such as methyl alcohol have been added, and the chemical separation of the salts required has been abandoned altogether in the favor of physical separating methods based on specific gravity or grain size, for the subsequent separation of the salts which had been precipitated together.

In reducing my invention to practice, I prepare a watery solution which is neutral and without foreign substances. The composition of the solution is so determined that at higher temperature it is saturated with sodium nitrate, and the sodium nitrate is separated by cooling the solution, the temperature being reduced but not being lowered to such an extent that the sediment will absorb larger amounts of ammonium chloride. The mother liquor which remains, is diluted with water at such a rate that when it is subsequently cooled further for separating the ammonium chloride, the sodium nitrate still present in the liquor remains substantially in solution.

If the solution has been prepared by reaction of ammonium nitrate with sodium chloride, sodium chloride is added to the mother liquor after the separation of the sodium nitrate, and a portion of the ammonium nitrate may also be added at this stage.

My method yields sodium nitrate and ammonium chloride at comparatively high degrees of purity, 85 to 90% being readily attained without washing or the like.

I have found that a solution of suitable composition which separates sodium nitrate and consequently had been saturated with this salt before being cooled for separating it, yields almost pure ammonium chloride upon further cooling, if, after the separation of the sodium nitrate, the separation of the ammonium chloride is performed at a still lower temperature which is effected by adding water to the mother liquor.

A particularly important application of my invention is the operation of my method in a closed cycle. In this case, sodium chloride is added after the separation of the sodium nitrate, with or without a portion of the ammonium nitrate, and before the separation of the ammonium chloride. Sodium chloride and ammonium nitrate may be added with the water for diluting the mother liquor in dissolved condition. The balance of salts required for making up the separated substances so that the initial solution is re-established, may be added after the separation of the ammonium chloride or before the next separation of sodium nitrate from the remade solution.

By way of example, in a closed cycle an initial solution is prepared at elevated temperature, say 100 centigrade, which has the following composition by weight:

| Na | HN$_4$ | NO$_3$ | Cl | H$_2$O |
|---|---|---|---|---|
| Grammes 24.21 | Grammes 17.56 | Grammes 85.53 | Grammes 23.06 | Grammes 1000 |

This solution is cooled to, say, 15 centigrade at which temperature the sodium nitrate is precipitated. It has absorbed small quantities of ammonium chloride. To the mother liquor sodium chloride, ammonium nitrate and water for diluting the liquor are added. The added salts may, as mentioned, be dissolved in the water for diluting the liquor. The diluted liquor is now cooled to a lower temperature, say—24 centigrade, and almost pure ammonium chloride is precipitated. The mother liquor is now made up as required for equivalence by adding salts, the diluting water is evaporated and the initial solution is ready for a new cycle.

My method may obviously also be started at any other stage of the closed cycle and the solution of the initial salt may be introduced during the first as well as during the second stage. The water to be evaporated is increased in proportion. Consequently, it is not necessary to dry the initial salts.

Further, instead of sodium chloride and ammonium nitrate which are added together, as described, I may, to the extent permitted by their molecular quantity relation, add mixtures of sodium nitrate and ammonium chloride or their solutions which are readily obtainable or are by products. In this case, the method only extends to the separation of such salts.

The following is a numerical example of my method:

1000 grammes of initial solution as described, cooled to 15 centigrade, yield 55.74 grammes of precipitate, of the following percentage:

Sodium nitrate _____ 86.45
Ammonium chloride _____ 12.91
Common salt _____ .66

After the precipitation, there remain 944.26 grammes of mother liquor to which are added
34 grammes of common salt
40.79 grammes of ammonium nitrate
198.2 grammes of water, making a total solution of 1217.25 grammes.

1217.25 grammes of diluted mother liquor, cooled to 24 centigrade, yield 24.92 grammes of precipitate, of the following precentage:

Ammonium chloride _____ 94.75
$NaNO_3$ _____ 2.65
$NH_4NO_3$ _____ 2.56

After the precipitation, there remain 1192.33 grammes of mother liquor to which are added
5.87 grammes of ammonium nitrate as makeup.

1198.2 grammes are evaporated, the evaporated water being
198.2 as above, leaving 1000 grammes of initial solution, ready for new cycle.

I claim:

1. The method of preparing and separating sodium nitrate and ammonium chloride, comprising precipitating sodium nitrate from a solution by cooling it, diluting the mother liquor, and precipitating the ammonium chloride by cooling the mother liquor below the temperature to which the solution has been cooled.

2. The method of preparing and separating sodium nitrate and ammonium chloride, comprising preparing a solution by the reaction of ammonium nitrate with sodium chloride, precipitating sodium nitrate from the solution by cooling it, diluting the mother liquor, and precipitating the ammonium chloride by cooling the mother liquor below the temperature to which the solution has been cooled.

3. The method of preparing and separating sodium nitrate and ammonium chloride, comprising preparing a solution which at higher temperature is saturated with sodium nitrate, cooling the solution to an extent sufficient to effect precipitation of the sodium nitrate, the temperature established being sufficiently high to prevent the absorption of appreciable quantities of ammonium chloride in the sediment, separating the precipitated sodium nitrate from the solution, diluting the mother liquor at such a rate that, upon subsequent cooling, the still present quantities of sodium nitrate remain substantially in solution, and cooling the diluted liquor for precipitating the ammonium chloride.

4. The method of preparing and separating sodium nitrate and ammonium chloride, comprising preparing a solution which at higher temperature is saturated with sodium nitrate, cooling the solution to an extent sufficient to effect precipitation of the sodium nitrate without causing separation of appreciable quantities of ammonium chloride, separating the precipitated sodium nitrate from the solution, diluting the mother liquor at such a rate that, upon subsequent cooling, the still present quantities of sodium nitrate remain substantially in solution, adding sodium chloride to the liquor, and cooling it for precipitating the ammonium chloride.

5. The method of preparing and separating sodium nitrate and ammonium chloride, comprising preparing a solution which at higher temperature is saturated with sodium nitrate, cooling the solution to an extent sufficient to effect precipitation of the sodium nitrate without causing separation of appreciable quantities of ammonium chloride, separating the precipitated sodium nitrate from the solution, diluting the mother liquor at such a rate that, upon subsequent cooling, the still present quantities of sodium nitrate remain substantially in solution, adding ammonium nitrate to the liquor, and cooling it for precipitating the ammonium chloride.

6. The method of preparing and separating sodium nitrate and ammonium chloride, comprising precipitating sodium nitrate from a solution containing sodium nitrate and ammonium chloride by cooling it, diluting the mother liquor, precipitating the ammonium chloride by cooling the mother liquor below the temperature to which the solution has been cooled, making up the contents of the liquor, and evaporating the diluting liquid.

7. The method of separating sodium nitrate and ammonium chloride, comprising adding to a solution containing sodium nitrate and ammonium chloride sodium chloride and a mixture of sodium nitrate and ammonium chloride, precipitating the sodium nitrate from the solution by cooling it, diluting the mother liquor, and precipitating the ammonium chloride by cooling the mother liquor below the temperature to which the solution has been cooled.

8. The method of separating sodium nitrate and ammonium chloride, comprising adding to a solution containing sodium nitrate and ammonium chloride a mixture from a solution of sodium chloride, sodium nitrate and ammonium chloride, precipitating the sodium nitrate from the solution by cooling it, diluting the mother liquor, and precipitating the ammonium chloride by cooling the mother liquor below the temperature to which the solution has been cooled.

WILHELM STEUDEMANN.